Jan. 18, 1966  H. TANTER ET AL  3,230,526
MOVING TARGETS ELECTROMAGNETIC DETECTION SYSTEMS
Filed Aug. 31, 1959  7 Sheets-Sheet 1

United States Patent Office 3,230,526
Patented Jan. 18, 1966

3,230,526
MOVING TARGETS ELECTROMAGNETIC
DETECTION SYSTEMS
Hervé Tanter, 19 bis Rue de Savoie, Villebon sur Yvette, Seine-et-Oise, France, and Gérard Marie Edouard van den Broek, 4 Villa, St. Symphorien, Versailles, Seine-et-Oise, France
Filed Aug. 31, 1959, Ser. No. 837,284
8 Claims. (Cl. 343—7.7)

The invention concerns remote detection systems by means of electromagnetic waves and more particularly those provided for the detection of moving targets.

There exist electromagnetic moving target detection systems which are able to distinguish moving targets among stationary ones by making use of Doppler effect. A number of those systems make use of unmodulated continuous waves and constitute the so-called continuous wave radar. Such systems allow a good cancellation of the stationary target echoes but they have the following drawbacks: they can deal with several moving targets in a given direction, only if these targets differ by their radial speed, they give no range information and further, their response time is of the same order of magnitude as the period of the Doppler frequency involved, with the consequence that their information rate is low.

Other systems make use of a pulse modulation of the transmitted wave, their pulse duration being in the vicinity of 1 μs. and the pulse repetition frequency a thousand cycles per second, or so. Such systems, in order to perform stationary target echo cancellation make use of a delay device. They are able to take in charge simultaneously a great number of targets in a given direction and also to measure their individual range. However, they suffer from a low sub-clutter visibility factor; the definition of this factor being the ratio of the amplitude of a stationary target echo to the minimum amplitude, measured at the input of the receiver, that the echo of a moving target superposed to the latter should reach to be at the threshold of detectability.

There exist, also, systems for the electromagnetic detection of moving targets which can deal with only one target at a time. They make use of a gating device which is such as to let the receiver pass only the echo signal which happens during a given short interval of time determined by the gating signal. In such systems, which are utilized for the tracking of moving targets inside a zone which contains a very small background of fixed echoes, the gating signal first strobes along the repetition period in order to explore the whole detection range—most generally inside a very small solid angle—and once a moving target has been detected, the movement of the gating signal becomes automatically controlled so as to remain centered on the target. However, these systems that make use of a moving gating signal are only employed during the searching period in order to detect a moving target inside a small solid angle. After finding the desired target the gating signal follows it instead of continuing to sweep.

One of the objects of the present invention is to provide a moving target electromagnetic detection system with a good sub-clutter visibility factor and the possibility of dealing simultaneously with a large number of targets in a given direction and of performing accurately the measurement of their range.

Another object of the present invention is the large increase of the information rate which results from such systems of moving target electromagnetic detection system.

There exist detection systems operating from the reflection of electromagnetic waves and having special means for the cancellation of stationary target echoes. Description of such systems can be found in "Radar System Engineering," L. N. Ridenour, McGraw-Hill Book Co., Inc., chapter 16 and also in a paper by Edward J. Barlow, appearing in the P.I.R.E. of April 1949, vol. 37, No. 4, pages 340–355, under the title "Doppler Radar." The principle of these systems is based on the resulting variation of frequency between a transmitted wave and the same when reflected from a moving target, this phenomenon being the so-called Doppler effect. By making such a variation of frequency to appear between a transmitted and a reflected wave, a signal is obtained which characterises moving targets. If the transmitted wave is a train of pulses, the output of the system consists also of pulses having the same repetition frequency as the transmitted pulses but also the two following characteristics: on one hand, their time position relative to the start of the transmitted pulses defines the range of the stationary or moving target—on the other hand their amplitude modulation permits to distinguish between echo signals received from moving and stationary targets. Such a system will be henceforth described as an "electromagnetic detection system making use of Doppler effect" or "Doppler radar," the latter being the term most commonly used in technical literature. A feature of this invention resides in obtaining the distance indication of moving targets using a Doppler radar. The moving targets are selected by filters which exclude those not amplitude modulated. The distance indication is obtained by using the cycle of a strobing gate as a time or distance reference instead of the normal radar repetition period. To speed up the receipt of information the selected moving target indications are supplied in parallel to a plurality of separate indicators, each having its sweep initiation timed to serve most effectively a given portion of the entire range.

The above mentioned and other features and objects of this invention and the manner of attaining them will become more apparent and the invention itself will be best understood, by reference to the following description of an embodiment of the invention taken in conjunction with the accompanying drawings, wherein.

Figure 1:
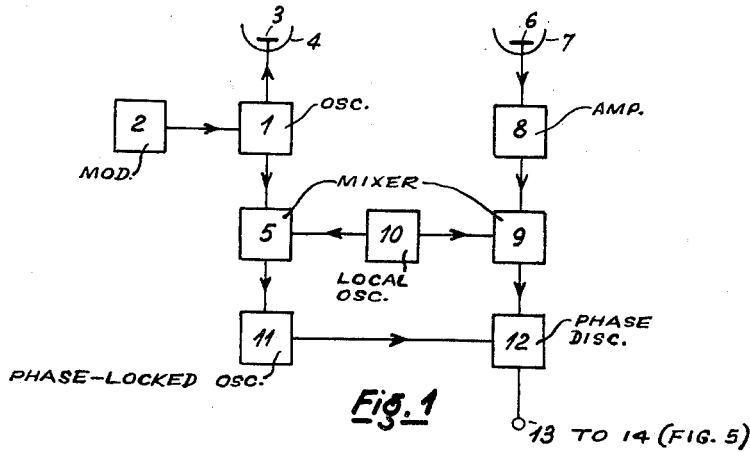
FIGURE 1 shows a block diagram of an electromagnetic detection system of the "Doppler radar" type without means for separating the fixed and moving target indications.

FIGURE 1 shows in block diagram form the circuitry of a known "Doppler radar." 1 is an oscillator, for example, making use of a magnetron, which is modulated by a modulator circuit 2. The oscillator feeds a transmitting antenna 3. The radiation from antenna 3 is focussed by the reflector 4. In a particular example, the operating wavelength is 3 cm. and the transmitted waves are modulated by pulses, 1 microsecond in length and with a repetition frequency of 4 kilocycles per second. A part of the energy transmitted to the antenna 3 is applied to a frequency mixing device 5. The wave reflected from a stationary or a moving target are collected by the receiving antenna 6 which is also fitted with a focussing device 7. The echo signal, received by the antenna 6 is applied, after an amplification by the device 8, to the frequency mixing device 9. A local oscillator 10, supplies both frequency mixing devices 5 and 9 from which are generated intermediate frequency signals at a frequency of some tens of megacycles per second. The output signals from the mixer 5 are applied to a phased-locked oscillator 11, normally blocked, which is unblocked at the start of the transmitted pulse. The output signal from oscillator 11 and the output signal from the mixer 9 are applied to a phase discriminator circuit 12, the output of which appears at the terminal 13. The oscillator 1 begins to oscillate at each transmitted pulse with a random phase and its oscillation lasts 1 microsecond. As the discrimination between moving targets and stationary targets results from the phase comparison between the transmitted wave and the echo wave, the transmitted wave is used to lock the phase of oscillator 11, the oscillation of which goes on keeping the memory of the phase of the transmitted pulse. Therefore, it becomes possible to compare the phase of the transmitted wave with that of the echo wave in the phase-discriminator circuit 12, the mixer circuits 5 and 9 having no influence on the phase relation between the waves which are applied to them. The signals obtained at the terminal 13 of the circuit 12 are pulses, the amplitude of which is constant if the signal is an echo from a stationary target or is modulated at the Doppler frequency if from a moving target; further, the position relative to time scale of the echo signals by comparison to the start of the transmitted pulse from which they are obtained, characterizes the range of the targets. Therefore, the output from the circuit 12 through the terminal 13 consists of periodic groups of pulses containing the information, in one hand on the nature of the targets, stationary or moving and on the other hand in their range.

Similar systems have been described in "Radar System Engineering," by Louis N. Ridenour, section 16, McGraw-Hill Book Co., Inc., New York.

Figure 2:
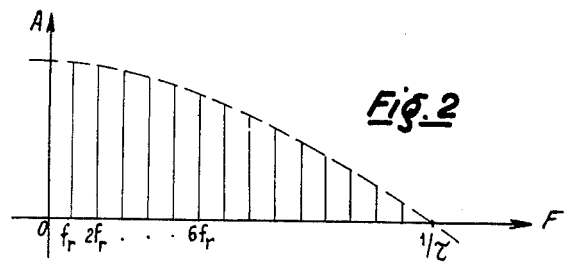
FIGURES 2, 3 and 4 show typical frequency spectra of signals obtained from system illustrated on FIGURE 1.

FIGURE 2 shows the frequency spectrum of an echo signal from a stationary target. On this figure, the frequency F appears in abcissa while the amplitude is given in ordinate. Such a spectrum consists of lines at the frequencies $nFr$ ($Fr$ being the pulse repetition frequency and $n$ being any number) the envelope of which is in the case of a rectangular pulse—the curve $$\frac{\sin \pi f \tau}{\pi f \tau}$$

Figure 3:
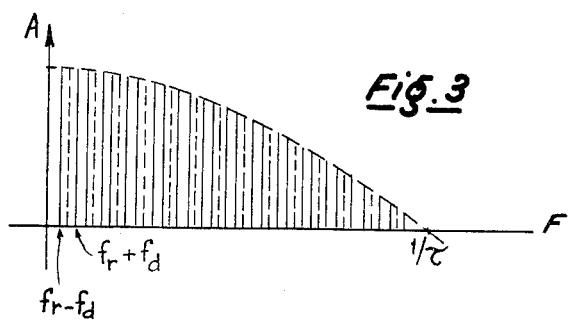
Figure 4:
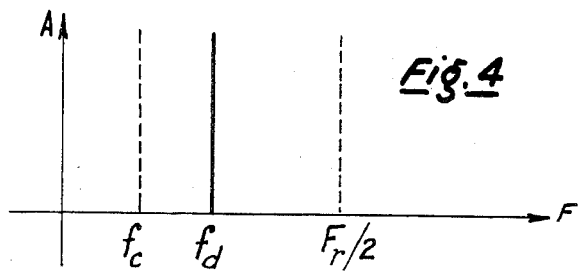

(In the FIGURES 2, 3 and 4, $\tau$ is the duration of the transmitted pulses.)

FIGURE 3 shows in the same manner the frequency spectrum of an echo signal from a moving target. It consists of lines at the frequencies $nFr+fd$, the envelope of which is in the case of a rectangular pulse, the curve $$\frac{\sin \pi f \tau}{\pi f \tau}$$

with $fd$ being the Doppler frequency related to the radial speed of the moving target.

Indeed, the frequency spectra of the signals obtained at the output of the phase discriminator circuit 12 are much more intricate than the figures show. They comprise, in particular, lines at the frequencies $nFr+fc$, due either to circuit instabilities (oscillator, modulator) or to the influence of wind which causes the so-called stationary targets to vibrate or also, as it will be stated later, to the gating of the signals (speed of displacement of the gating signals). All these parasitic lines appear symmetrically in either side of the $Fr$ lines. Considering now FIGURE 4 which shows the part of the frequency spectrum that is comprised between 0 and $Fr/2$, it is clear that all the information contained in the signals utilizable for the discrimination of moving targets echoes whose radial speed produces a Doppler frequency higher than $fc$ are contained in the frequency band extending from $fc$ to $Fr/2$. This property is explained hereunder in relation with FIGURE 5.

Figure 5:
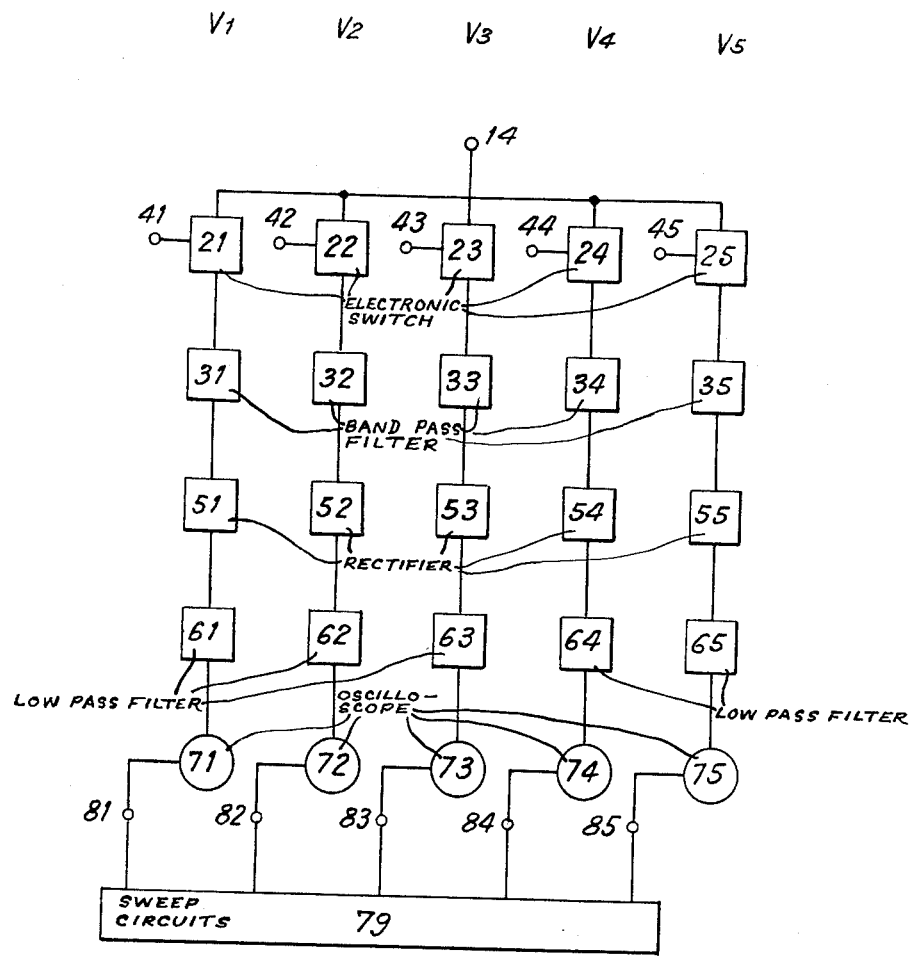
FIGURE 5 shows a moving target indicator system making use of the invention with the control circuits omitted.

The circuit system shown in FIGURE 5 consists of five identical channels $V_1$, $V_2$, $V_3$, $V_4$, $V_5$. The output signals from the terminal 13, of FIGURE 2, are applied to the input terminal 14 of the circuit system of FIGURE 5, to which are connected in parallel the input leads of the five electronic switching devices 21, 22, 23, 24, 25. These switching devices present normally a high series impedance to the flow of the signals applied to their input terminal towards the filters 31, 32, 33, 34, 35 connected at their output terminals respectively. Each switching device, which can be of the so-called "gating device" type, has a control terminal 41, 42, 43, 44, 45. When a suitable controlling potential is applied to one of the terminals 41 to 45, the corresponding switching device lets the signals applied to input terminal 14 pass towards the filter which is connected to it. Filters 31, 32, 33, 34, 35 are band-pass filters, the pass band of which, extends from $fc$ to $Fr/2$, as explained hereabove. Each filter is followed by a rectifier 51, 52, 53, 54, 55 and a low-pass filter 61, 62, 63, 64, 65 the cut-off frequency of which is lower than the lowest Doppler frequency that has to be detected. The latter is generally some tens of cycles per second. The output signals from each low-pass filter are applied to the oscilloscopes 71, 72, 73, 74, 75 respectively, for example to the vertical deflection plates while the horizontal sweep is produced at the recurrent frequency $fe$, by waves from sweep circuit 79, as explained more fully later.

Now will be described, in relation with FIGURE 6, the means provided for the delivery of the controlling pulses for the electronic switching devices 21, 22, 23, 24, 25 (FIGURE 5). A quartz-controlled generator 15 delivers a sinusoidal wave at the frequency $kFr$. This wave is applied to a frequency divider circuit associated to a pulse generator 16, which delivers, at its output terminal 17, pulses at the frequency $Fr$. These pulses are used to synchronize the various circuits throughout the equipment and particularly the modulator 2 (FIGURE 1). The sinusoidal wave at the output of circuit 15 is also applied to a rotating phase-shifter 18 which delivers a wave at the frequency $k(Fr-fe)$, with $kfe$ being the number of revolutions per second of the phase-shifter axis. The output signals from phase-shifter 18 are applied to a frequency divider 19 which delivers at its output pulses at the frequency $n(Fr-fe)$, $n$ being the number of channels of the circuit system of FIGURE 6, namely five in the example under consideration. These signals are applied, on one hand, in parallel to the input terminals of the "electronic gates" 26, 27, 28, 29, 30 and on the other hand to a frequency divider 46 which delivers at its output pulses at the frequency $Fr-fe$. The gates 26, 27, 28, 29, 30 are normally at their cut-off position and they receive gating pulses from the monostable multivibrators circuits 36, 37, 38, 39, 40 respectively, each of the monostable circuits, except circuit 36, being controlled by the output pulses from the preceding gating device.

Figure 6:
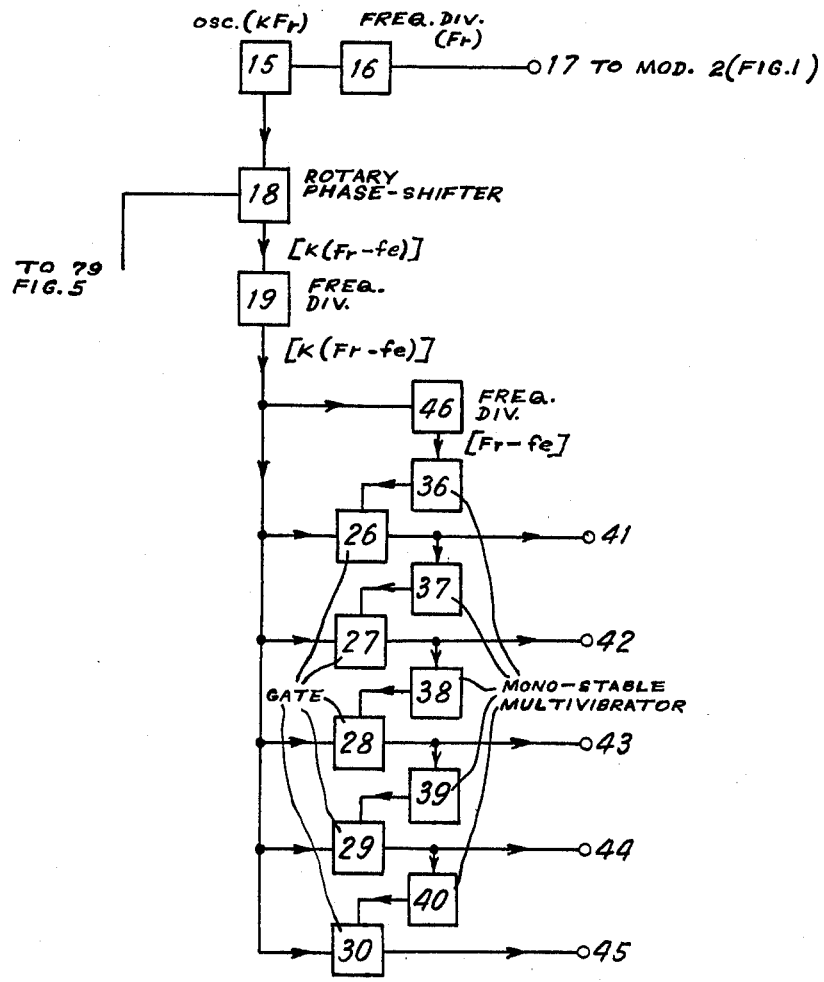
FIGURE 6 shows a control circuit with a generator of controlling pulses for the switching device.
Figure 7:
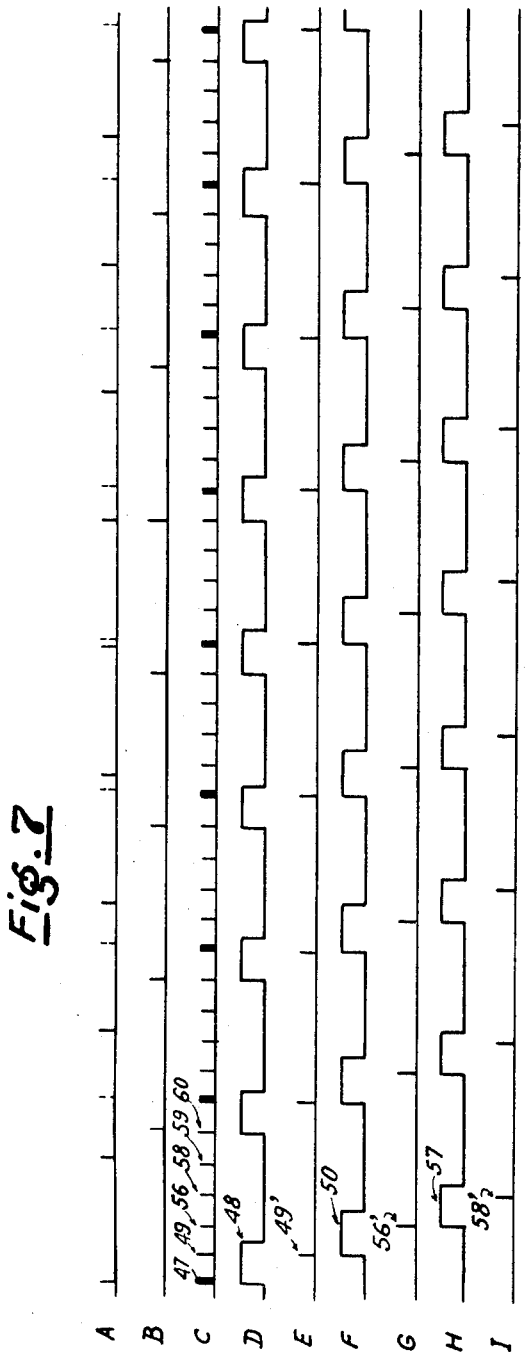
FIGURE 7 shows the waveforms at various points of the circuits shown on FIGURE 6.

The operation of the circuit of FIGURE 6 will be explained by reference to the waveforms of FIGURE 7, showing the signals appearing at various points of the circuit. It shows in A, in solid line, the pulses at the repetition frequency $Fr$ which are obtained from terminal 17 (FIGURE 6), in B the pulses at the repetition frequency $Fr-fe$ such as they appear at the output of divider circuit 46 (FIGURE 6) and in C, the pulses at the repetition frequency $5(Fr-fe)$ such as they appear at the output of divider 19 (FIGURE 6). For the purpose of illustration, frequency $fe$ is taken equal to ⅕ of the frequency $Fr$. Actually the frequency $Fr$ is about 4 kilocycles per second while the frequency $fe$ is only of few cycles per second. Each of the monostable circuits 36, 37, 38, 39, 40 delivers, when triggered by a controlling pulse, a pulse the duration of which is slightly longer than $$\frac{1}{5(Fr-fe)}$$

The gating devices 26, 27, 28, 29, and 30 are unblocked while receiving a controlling pulse from the monostable circuit there attached. The pulse 47 (FIGURE 7) is applied to the monostable circuit 36 (FIGURE 6) which delivers at its output a pulse 48, curve D. As long as this pulse lasts, the electronic gating device 26 is unblocked and the pulse 49 is applied to terminal 41 (FIGURES 5 and 6).

The output terminals 41, 42, 43, 44, 45 of the gating devices 26, 27, 28, 29 and 30 are connected to the control terminals 41, 42, 43, 44, 45 of the switching devices 21, 22, 23, 24, 25 (FIGURE 5). The signals obtained from terminal 41 are shown at E (FIGURE 7) in which the pulse 49 appears at 49'. The same pulse is also applied to the monostable circuit 37 which delivers at its output the pulse 50 (curve F, FIGURE 7) which is applied to the gating device 27 which lets the pulse 56 pass towards terminal 42. The pulse appearing at terminal 42 is shown at 56' (curve G, FIGURE 7). The same process is repeated with the following circuits, the pulse 56' being applied to the monostable circuit 38 which delivers a pulse 57 (curve H, FIGURE 7). The latter pulse is used to unblock the gating device 28 which delivers at its output the pulse 58', curve I. The circuits 39–29 and 40–30 (FIGURE 6) operate in the same manner, but the corresponding pulses have not been shown in FIGURE 7. The pulses 49, 56, 58, 59 and 60 are therefore applied to the terminals 41, 42, 43, 44 and 45, and the operation takes place at each repetition period at the frequency $Fr-fe$.

The controlling pulses appertaining to the same channel, to channel $V_1$, for example, and which appear to terminal 41 (FIGURES 5 and 6) are therefore strobing along the interval extending between two consecutive pulses at the frequency $Fr$. The pulse appertaining to channel number 1 has been drawn in very solid line under index C, FIGURE 7, and in dotted line in curve A. The frequency at which the controlling pulse of channel $V_1$ strobes along a whole repetition period is $fe$. It is understood that the same applies to the controlling pulses of the four channels $V_2$, $V_3$, $V_4$, $V_5$ which are delayed with respect to those of $V_1$ by intervals $$\frac{1}{5(Fr-fe)}, \frac{2}{5(Fr-fe)}, \frac{3}{5(Fr-fe)}, \text{ and } \frac{4}{5(Fr-fe)}$$

respectively.

Now the operation of channel $V_1$ is to be explained in detail, that of $V_2$, $V_3$, $V_4$, $V_5$ being identical.

As it has been explained previously, the signals applied to terminal 13 are made of pulses at the repetition frequency $Fr$ due to echoes on stationary or moving targets, the position relative to time of those pulses with respect to the start of the transmitted pulse characterizing the range of the targets and the pulses obtained from echoes of moving targets being amplitude modulated by a sinusoidal wave of frequency $fd$. Therefore, the signals obtained at the output of switching device 21 of the channel $V_1$, during a time interval $1/fe$, proceeds successively from all the points explored by the beam of the transmission antenna, being understood that the value of the repetition period of the pulses has been chosen in accordance with the maximum range of the system. The pulse which corresponds to a given target will then appear at the output of switching device 21 during a time interval equal to the duration of the coincidence between the control pulse of device 21 (FIGURE 6) called gating pulse, and the echo pulse received from said target.

Figure 8:
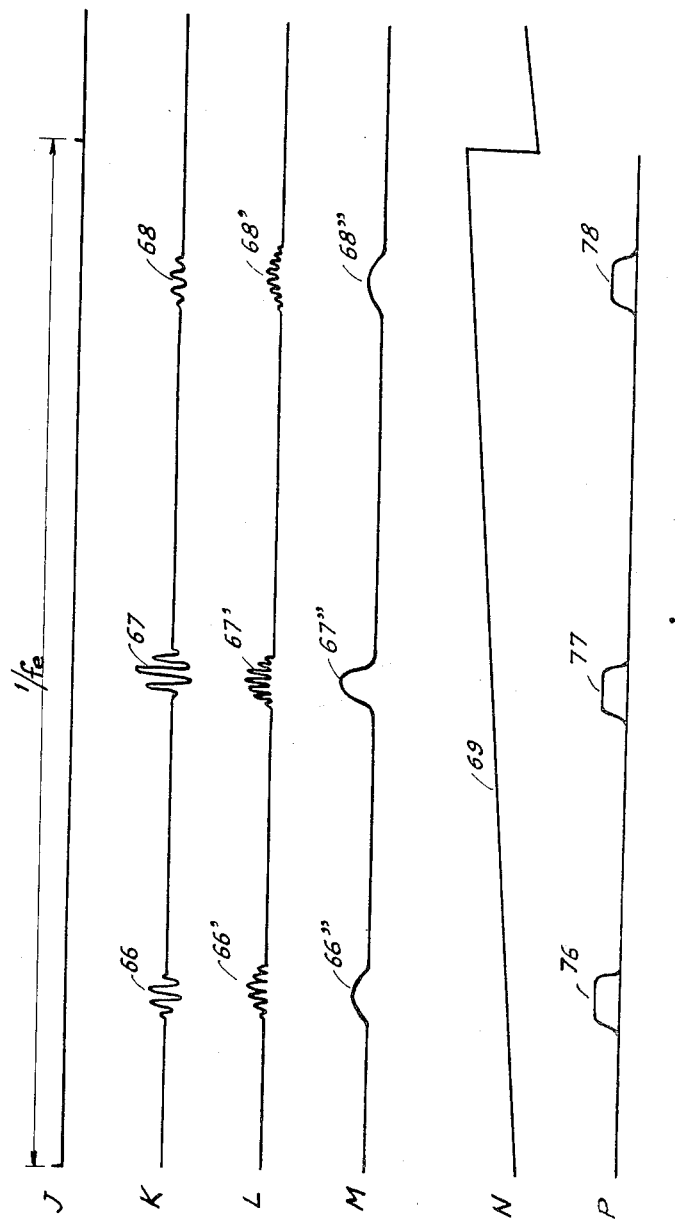
FIGURE 8 shows the waveforms at various points of the circuits shown on FIGURE 5.

Now reference is made to FIGURE 8 which shows the waveform appearing at various points of channel $V_1$ (FIGURE 5). The signals obtained at the output of switching device 21 are applied to a band-pass filter which passes only the so-called Doppler frequencies, i.e. the only signals that proceed from moving targets. The signals obtained at the output of filter 31 are sinusoidal waves, at the frequency $fd$ which is a characteristic of the radial speed of the target, and having an amplitude which is modulated because of the relative displacement of the gating pulse with respect to successively received echoes. FIGURE 8 shows three signals 66, 67, 68 (curve K) obtained during an exploration period $1/fe$ for a given direction of the transmission antenna, the exploration period $1/fe$ in range scale, being represented in J. Each of those signals is made, as previously explained, of a sinusoidal wave at the Doppler frequency, amplitude modulated because of the displacement of the gating signal. Said signals are rectified in circuit 51, in such a manner that the wave form obtained at its output appears as in L (FIGURE 8), the waveforms appertaining to 66, 67, 68 of curve K being shown under indexes 66', 67', 68' on curve L. The low-pass filter 61 delivers at its output the envelope of curves 66', 67', 68', the corresponding waveforms being shown at 66", 67", 68", curve M. Those signals are applied to the vertical deflection plates of an oscilloscope, the horizontal sweep of which is caused to recur at intervals at the frequency $fe$ by the application to the sweep control terminal 81 (FIG. 5), a saw-tooth wave such as shown in 69, curve N (FIGURE 8). Therefore the oscilloscope screen displays bright spots such as shown in P (FIGURE 8), the spots 76, 77, 78 appertaining to signals 66, 67, 68 of curve K respectively. The positions of the spots displayed in the screen, if compared to the beginning of the horizontal sweep, characterizes the respective ranges of the moving targets. Long persistence cathode ray screens have to be used, 2 minutes for example, because the sweep frequency is of the order of magnitude of 1 cycle per second.

The channels $V_2$, $V_3$, $V_4$, $V_5$ operate in the same way, each of them with a time lag of ⅕ $fe$, so that in order to obtain a similar display on the five oscilloscope screens 71, 72, 73, 74, 75, the sweep waves have to be shifted from each other by $fe/5$. Said sweep waves can be obtained from a common circuit, the block-diagram of which is shown at 79, synchronised with the rotation of the rotating phase shifter 18 (FIGURE 6) and which applies the controlling signals for sweep to the terminals 81, 82, 83, 84 and 85 of the oscilloscopes 71, 72, 73, 74 and 75 (FIGURE 5).

For the sake of simplifying the showing the sweep generator is shown as a simple rectangle. There are produced separate sweep waves for the individual indicators 71 to 75. Each sweep wave has a time duration of $1/fe$ and the successive sweeps are started as times displaced $1/nfe$ in the example ⅕ $fe$, from the preceding sweep. These sweep waves are synchronized under control of rotary phase shifter 18. The specific manner of synchronizing these sweep circuits may be accomplished by applying the control signal from 18 to them successively at appropriate time intervals in a number of ways by the means well known to those skilled in the art.

Figure 9:
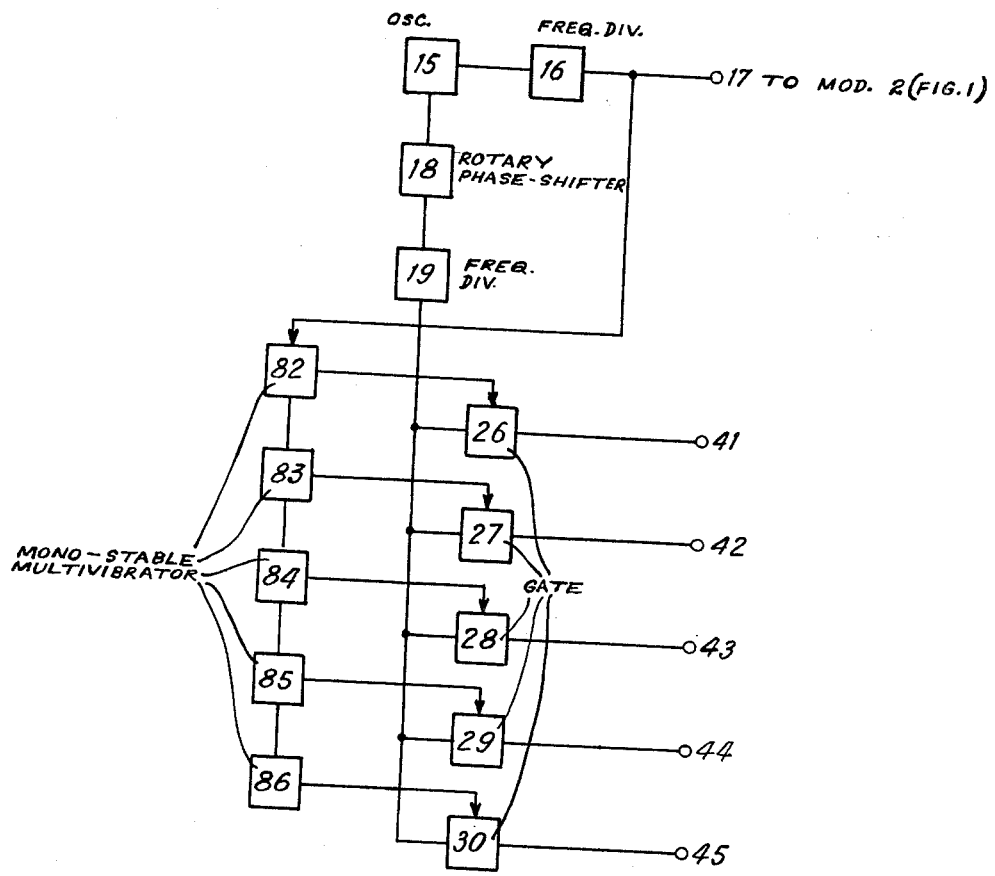
FIGURE 9 shows an alternative form of the controlling pulse generator to replace the switching device shown on FIGURE 6.

Now will be described an alternative of the information sampling device and of the display system. In that alternative the arrangements shown on FIGURES 1 and 5 are identical (except for the sweep frequency of the oscilloscopes) the only sampling pulse generator being modified as shown on FIGURE 9. In FIGURES 6 and 9, the devices performing the same operation are given the same reference characters. They show, in particular, the stabilized oscillator 15, the frequency divider and pulse generator 16 which delivers from terminal 17 one microsecond pulses at the repetition frequency $Fr$ (4 kilocycles per second in the example considered) represented under index A', FIGURE 10, the rotating phase-shifter 18 and the frequency divider and pulse generator 19 which delivers at its output pulses of frequency $n(Fr-fe)$ represented under index B', FIGURE 10. Those pulses are applied to electronic gating devices 26, 27, 28, 29 and 30 normally blocked. The controlling pulses are obtained from circuits 82, 83, 84, 85, 86 which deliver pulses, ⅕ Fr in duration and of repetition frequency Fr, each pulse train lagging ⅕ Fr from the preceding. The corresponding waveforms have been represented at C', E', G', I', L' respectively on FIGURE 10. The circuits 82, 83, 84, 85, 86 can consist, for example, of monostable multivibrators triggering each other. It is easily understandable that the electronic gating devices 26, 27, 28, 29, 30 (FIG. 9) deliver at their output terminals 41, 42, 43, 44, 45 pulses of such shape as represented at D', F', H', J', L' (FIG. 10).

Figure 10:
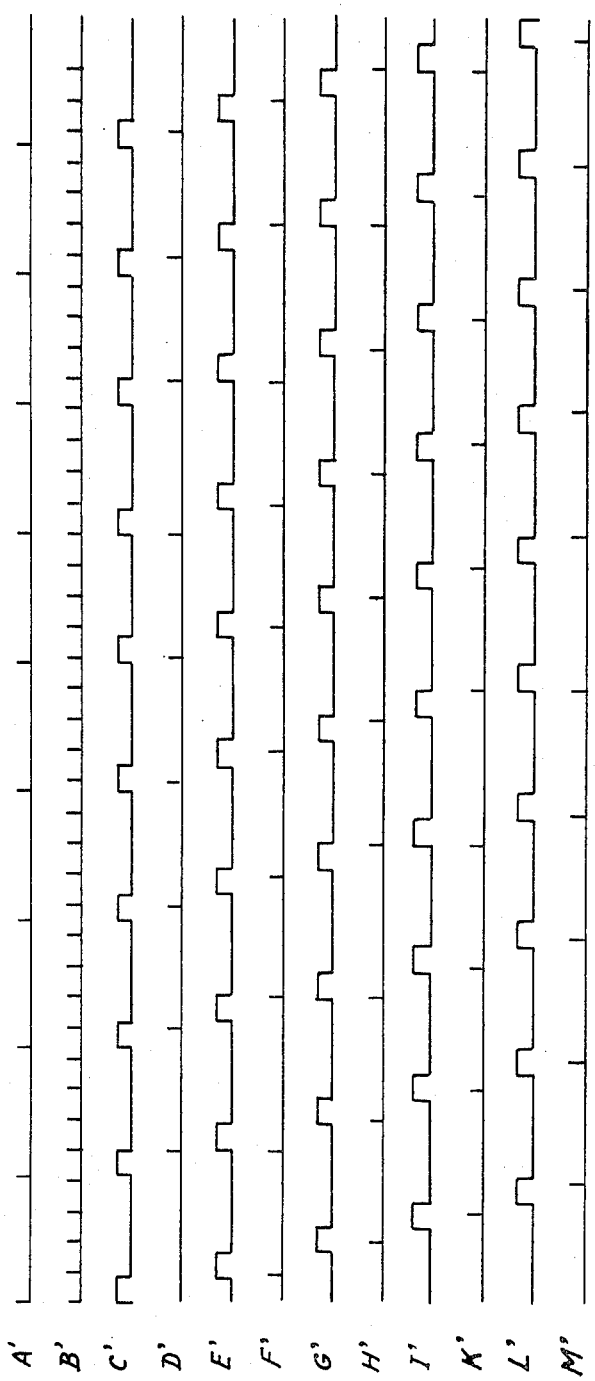
FIGURE 10 shows the waveforms at various points of the circuits shown on FIGURE 9.

The pulses D', F', H', J', L' of FIGURE 10 are respectively to control the electronic gating devices 21, 22, 23, 24, 25 (FIGURE 5) and the output of each channel $V_1 \ldots V_5$ consists of signals of such shape as shown on FIGURE 8. It is easily understandable that, in such case, each channel receives only signals proceeding from moving target echoes situated in a zone, the depth of which is equal to ⅕ of the maximum range of the radar. The duration of the exploration by the gating signal of that zone, appertaining to one channel is equal to ⅕ fe. The signals obtained at the output of each channel are applied respectively, after convenient amplification, to the vertical deflection plates of five oscilloscopes, as shown on FIGURE 5. The horizontal sweep is, in such case, identical for the five oscilloscopes and is obtained from saw-tooth waves of a duration equal to fe and at the frequency of substantially 5 fe more precisely 5 fe $$\frac{FR}{FR-fe}$$

which are applied simultaneously to the horizontal deflection plates of the oscilloscopes 71 to 75, FIG. 5. Therefore each oscilloscope screen displays the signals appertaining to a range equal to ⅕ of the maximum range.

Figure 11:
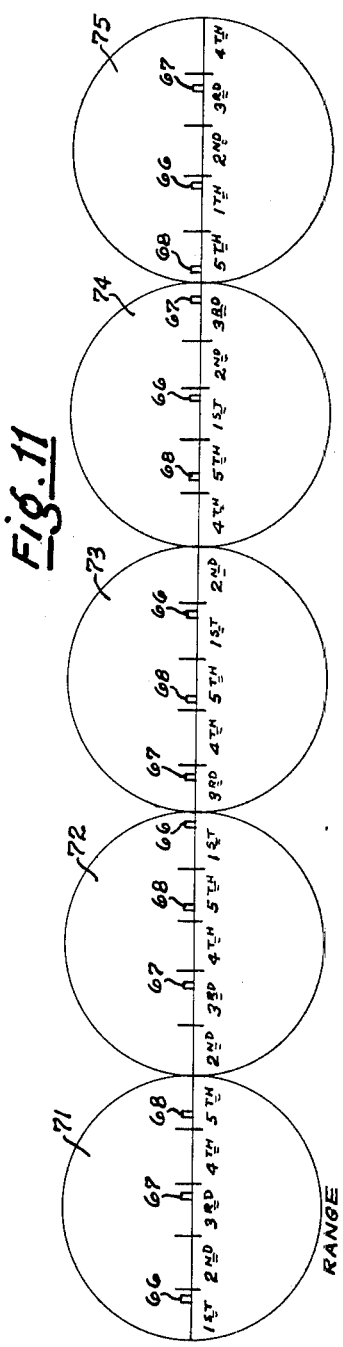
FIGURE 11 illustrates the display on the indicators of FIGURE 5 with signals applied under control of the circuit of FIGURE 6.

An explanation of the nature of the display on the various displays is made with reference to FIG. 11. Assume the total distance scanned by the radar is thirty miles, then each of oscilloscope indicators 71 through 75 will be responsible for providing the indication of moving objects in the first six miles, the sixth-twelfth mile interval and so on to the twenty-fourth-thirtieth mile interval, respectively.

Using a gating system as shown in FIG. 6 and the sweep frequency and duration described in connection with the first embodiment all moving targets in a given direction are shown on each screen 71 to 75, such displays are each in appearance the same as shown on a class B radar display. However, because of the strobing gating they are not built up rapidly. FIG. 11 discloses the manner in which targets will appear on the separate indicators, the portions of the range for each display being indicated.

Assume that the three targets 66, 67 and 68 of FIG. 8 are positioned at distances of five miles, sixteen miles and twenty-six miles, respectively, from the radar. This places target 66 in the significant area of indicator 71, target 67 in the significant area of indicator 73 and target 68 in the significant area of indicator 75.

In FIG. 11 the appearance of each of the indicators 71 through 75 after a complete scan of the area by the strobing pulses is completed. All three targets appear but during the first one-fifth of the period for sweep fe, targets 66, 67 and 68 will be reproduced on indicators 71, 73 and 75, respectively. During the successive fifths of the sweep period the targets appear as follows: second fifth 67 on 72, 68 on 74, 66 on 75; third fifth 67 on 71, 68 on 73 and 66 on 74; during the fourth fifth 68 on 72, 66 on 73 and 67 on 75; and during the fifth fifth 68 on 71, 66 on 72 and 67 on 71.

When the gating circuit of FIG. 9 is used, the sweep frequency is five times as high and the output gates are timed to permit passage of pulses to the respective indicators only during the respective times corresponding to their portion of the range. Consequently the entire sweep is effective and more accuracy is possible because of the larger range scale which can then be used. The displays will again be like a B scope in appearance, however.

Two examples of realization of the invention have just been described and, in particular, two methods for the sampling of the signals appearing at the output of the circuit shown in FIGURE 1. It is clear that, without getting out of the scope of the invention, it could be possible to make use of a larger number of gating pulses or other means of information sampling.

The invention enables the separation of small moving targets, from closely adjacent large fixed targets while permitting accurate distance measurements. To accomplish the distinction of echoes from small moving targets it is necessary to separate them from others with a low-pass filter, which in effect, integrates them over a relatively long time period. This, however, tends to destroy the time, or distance information carried by the pulses.

According to the invention there is provided a gating pulse train in which the repetition rate of the pulses differs from the radar pulse repetition rate by a small increment. Thus, if the repetition rate of the radar pulse is Fr, the repetition rate of the gating pulses may be $Fr-fe$ or $Fr+fe$. The difference frequency fe should be a small sub-multiple of the frequency Fr. In this manner the range is effectively explored in steps by the gating pulses.

The gating pulses operate gates 21–25 which serve to permit portions of the return echo signals to pass to the usual band pass filters 31–35 which will serve to pass only the Doppler frequencies and thus block out all but the signals from moving targets. These are rectified and passed through the low-pass filters 61–65 to remove the residual Doppler frequency components.

Because of the frequency difference in the repetition rate of the radar pulse and the gating pulses and gating circuit will effectively strobe the return echoes. The effective time needed to scan the entire range is then equal to the number of radar cycles as will be determined by the ratio of the radar repetition rate Fr, to the difference between this rate and the repetition rate that is fe. This may be called a cyclic frequency, representing the time cycle of initial pulse coincidence on the indicators for successive pulse trains.

In the usual Doppler moving target system, the distance information is normally lost in the low-pass filter because its band pass is lower than Fr. However, if gating pulses are provided to scan the distance at a ratio of fe and with respect to Fe and indicators are provided having a sweep frequency equal to the cyclic repetition period of coincidence between the transmitted radar pulses and control gating pulses, and synchronized with respect thereto, the distance measurement, obscured by the low-pass filters can be recovered and indicated.

This, however, is a slow process when all of the range and azimuth sectors are to be covered. It depends on the period of the cyclic frequency. It may be several hundred times as long as the normal radar repetition period. For example with a radar pulse repetition rate Fr of 4000 cycles per second, and a value fe of 10 cycles per second 400 radar cycles occur before a complete scan is accomplished.

To speed up the indication, the Doppler echoes may be supplied to a group of parallel processing channels each of which is gated by gating signals as the rate $Fr-fe$ or $Fr+fe$. The timing of the gating pulses for the various channels is, however, different for the channels, depending upon the manner in which the displays are to be divided. The display may be divided into $n$ angular sectors in which $n$ is the number of channels. The sweep duration for each display is then equal to $1/fe$ repeated at intervals of $fe$, with successive time displacement $$\frac{1}{nfe}$$

and the sweep waves of succeeding indicators and each display shows the entire range but only in a sector $1/n$.

On the other hand the display may be divided into $n$ ranges or zones. In this case the sweep of the indicators is equal to $1/n$ of the maximum range of the radar, and the indicator sweep repetition frequency is $nfe$, which waves may be applied simultaneously to all the indicators.

While the principles of the above invention have been described in connection with specific embodiments and particular modifications thereof it is to be clearly understood that this description is made by way of example and not as a limitation of the scope of the invention.

What we claim is:

1. In a Doppler radar system, a sampling device for the information which consists of periodic groups of signals appearing during successive and consecutive periods of known origin at a repetition frequency F, comprising an input terminal to which said signals are applied, said sampling device having a repetition period differing from F by a sub-multiple thereof $n$ transmission channels, $n$ switching devices, each having an input terminal, an output terminal and a control terminal, the input terminals of the $n$ electronic switching devices being connected to the said signal input terminal, the $n$ output terminals of said switching devices being connected to $n$ utilization terminals, respectively, each switching device being so provided as to present normally a very high impedance between input and output terminals in the absence of a control pulse and a low impedance between said terminals when a controlling pulse is applied to the corresponding control terminal and a source of controlling pulses for successively applying control pulses to said control terminals to effect sampling of said signals and to deliver the samples of pulses applied to its input terminal successively and cyclically to the output terminals.

2. In a Doppler radar system according to claim 1, an arrangement providing for moving target detection comprising a pulse electromagnetic detection device, delaying at its output successive pulses during each repetition period to provide said groups of signals, the position of said pulses relative to a time scale, characterizing the range of the target and the modulation of said pulses allowing a discrimination between echoes from stationary and moving targets, said control pulses differing in repetition rate from F by a small frequency $f$, each of said $n$ transmission channels comprising a series band-pass filter, the upper cut-off frequency of which is equal to one half the repetition frequency F while the lower cut-off is in the order of magnitude of some hundred cycles, $n$ cathode ray display devices coupled respectively to the outputs of the $n$ transmission channels and means to provide a linear sweep for said cathode ray device, the upper frequency of which is equal to $f$.

3. A device for sampling information which consists of periodic groups of electrical signals contained in successive periods of known origin, the repetition frequency being equal to F, comprising an input terminal to which the aforesaid signals to be sampled are applied, $n$ transmission utilization channels, $n$ switching devices, each having an input terminal, an output terminal and a control terminal, the input terminals of the $n$ electronic gating devices being connected to the said signal input terminal, the $n$ output terminals of the switching devices being connected to the $n$ utilization channels respectively, each of the switching devices being so provided as to present normally a very high impedance between input and output terminals or a low impedance between said terminals when a controlling pulse is applied to the corresponding control terminal, a controlling pulse generator at the frequency $n(F+f)$, the frequency $f$ being small if compared to F and the duration of the controlling pulses being small compared to $1/nF$, switching means synchronous with the signals applied to the input terminal, having an input terminal to which are applied the controlling pulses at the frequency $n(F+f)$ and $n$ output terminals connected respectively to the $n$ control terminals of the said switching means, said switching means serving to connect the input terminal to the said output terminals, each channel being connected during $1/n$th of the repetition period of the pulses at the frequency F.

4. An electromagnetic moving target detection system comprising: a pulsed electromagnetic detection device making use of the Doppler effect, delivering at its output successive pulses at each repetition period the position of which relative to time scale characterizes the range of the target and the modulation of which allows a discrimination between echoes from stationary or moving targets, $n$ reception channels, each channel comprising in series a band-pass filter, the upper cut-off frequency of which is equal to one half the repetition frequency of the transmitted pulses while the lower cut-off frequency is of an order of magnitude of some hundred cycles, a rectifier and a low-pass filter, the cut-off frequency of which is lower than the lower cut-off frequency of the said band-pass filter, an information sampling device to sample the signals obtained at the output of said electromagnetic detection device at a rate differing by a small sub-multiple from said repetition period and distribute them to the $n$ receiving channels, $n$ cathode ray display indicators, means to apply respectively to said cathode ray indicators the signals obtained at the output of the $n$ receiving channels and means to control a linear sweep of the said indicators, the sweep frequency of which being equal to $nf$.

5. In a radar system of the type in which a receiver is provided which supplies at its output pulses of relatively fixed amplitude from fixed targets and pulses which vary in amplitude at a frequency dependent upon movement of the object with respect to the radar system,
   (a) said radar system operating to transmit pulses at a first repetition rate,
   (b) a control pulse source for producing control pulses at a second repetition rate differing from said first rate by a sub-multiple thereof,
   (c) a gating means and a filter having a pass-band substantially lower than said pulse repetition frequency connected in tandem to the output of said receiver,
   (d) means for applying said control pulses to said gating means to permit passage of signals from said receiver through said filter,
   (e) an indicator connected to the output of said filter,
   (f) means to produce an indicator sweep voltage having a frequency related to said radar repetition rate and said control pulse repetition rate,
   (g) and means for applying said sweep voltage and the output signals from said filter to said indicator.

6. In a radar system according to claim 5, a circuit wherein there are provided a plurality of said tandem connections of gating means and filters connected in parallel to the output of said receiver, and said means for applying said control pulses to said gating means comprises means for delaying the said pulses to provide for successive opening of said gates.

7. In a radar system according to claim 6, an arrangement wherein there are provided,
   (a) a plurality of indicators connected, respectively, to each of said channels,
   (b) wherein the sweep voltage frequency is equal to the reciprocal of the difference between said radar pulse repetition rate and said control pulse repetition rate, (c) and said means for applying said sweep voltage comprises means for successively applying the sweep voltage with a delay equal to its period divided by the number of channels.

8. In a radar system according to claim 6, an arrangement wherein there are provided,
(a) a plurality of indicators connected, respectively, to each of said channels,
(b) wherein said sweep voltage frequency is equal to the reciprocal of the difference between said radar pulse repetition rate and said control pulse repetition rate multiplied by the number of said channels,
(c) and said means for applying said sweep voltage comprises means to apply said voltage simultaneously to all said indicators.

References Cited by the Examiner
UNITED STATES PATENTS

| | | | |
|---|---|---|---|
| 2,741,762 | 4/1956 | Page | 343—13 |
| 2,995,742 | 8/1961 | Braden | 343—11 |

CHESTER L. JUSTUS, *Primary Examiner.*

FREDERICK M. STRADER, *Examiner.*

UNITED STATES PATENT OFFICE
CERTIFICATE OF CORRECTION

Patent No. 3,230,526                January 18, 1966

Hervé Tanter et al.

It is hereby certified that error appears in the above numbered patent requiring correction and that the said Letters Patent should read as corrected below.

In the grant, line 3, after "France," insert -- assignors, by mesne assignments, to International Standard Electric Corporation, of New York, N. Y., a corporation of Delaware, --; lines 12 and 13, for "Hervé Tanter and Gérard Marie Edouard van den Broek, their heirs" read -- International Standard Electric Corporation, its successors --; in the heading to the printed specification, lines 4 to 7, for "Hervé Tanter, 19 bis Rue de Savoie, Villebon sur Yvette, Seine-et-Oise, France, and Gérard Marie Edouard van den Broek, 4 Villa, St. Symphorien, Versailles, Seine-et-Oise, France" read -- Hervé Tanter, Villebon sur Yvette, Seine-et-Oise, France, and Gérard Marie Edouard van den Broek, St. Symphorien, Versailles, Seine-et-Oise, France, assignors, by mesne assignments, to International Standard Electric Corporation, New York, N. Y., a corporation of Delaware --.

Signed and sealed this 10th day of January 1967.

(SEAL)
Attest:

ERNEST W. SWIDER
Attesting Officer

EDWARD J. BRENNER
Commissioner of Patents